United States Patent [19]

Hao et al.

[11] Patent Number: 5,708,188
[45] Date of Patent: Jan. 13, 1998

[54] MIXED CRYSTALS AND SOLID SOLUTION OF 1,4-DIKETOPYRROLOPYRROLES

[75] Inventors: Zhimin Hao, Marly; Abul Iqbal, Arconciel; Bernhard Medinger, Giffers; Olof Wallquist, Marly, all of Switzerland

[73] Assignee: Ciba Specialty Chemicals Corporation, Tarrytown, N.Y.

[21] Appl. No.: 535,438

[22] Filed: Sep. 28, 1995

[30] Foreign Application Priority Data

Sep. 28, 1994 [CH] Switzerland ............... 2936/94

[51] Int. Cl.$^6$ ............................................. C07D 487/04
[52] U.S. Cl. ............ 548/453; 548/305.1; 548/311.7; 548/364.7; 548/255; 548/266.4; 548/224; 548/217; 548/235; 548/159; 544/373; 544/333; 544/144; 546/199; 546/276.7; 106/494; 534/752
[58] Field of Search ............. 548/453, 305.1, 548/311.7, 364.7, 255, 266.4, 224, 217, 235, 159; 544/373, 333, 144; 546/199, 276.7; 106/494

[56] References Cited

U.S. PATENT DOCUMENTS

| | | | |
|---|---|---|---|
| 4,579,949 | 4/1986 | Rochat et al. | 546/167 |
| 4,632,704 | 12/1986 | Babler | 106/288 |
| 4,720,305 | 1/1988 | Iqbal et al. | 106/288 |
| 4,778,899 | 10/1988 | Pfenninger et al. | 548/453 |
| 4,783,540 | 11/1988 | Babler | 548/453 |
| 4,810,304 | 3/1989 | Jaffe et al. | 106/494 |
| 5,220,040 | 6/1993 | Mather et al. | 549/299 |
| 5,223,624 | 6/1993 | Babler et al. | 546/49 |
| 5,347,014 | 9/1994 | Babler | 548/453 |
| 5,476,949 | 12/1995 | Wallquist et al. | 548/453 |
| 5,518,539 | 5/1996 | Hao et al. | 106/495 |
| 5,529,623 | 6/1996 | Hendi et al. | 106/495 |

FOREIGN PATENT DOCUMENTS

| | | |
|---|---|---|
| 0181290 | 5/1986 | European Pat. Off. . |
| 0184982 | 6/1986 | European Pat. Off. . |
| 0190999 | 8/1986 | European Pat. Off. . |
| 0256983 | 2/1988 | European Pat. Off. . |
| 0492893 | 7/1992 | European Pat. Off. . |
| 0604370 | 6/1994 | European Pat. Off. . |

OTHER PUBLICATIONS

Ibqual, et al. Bull. Soc. Chim. Belg., 97(8–9), 1988, 615–643.
Chassot, Chimia, 48, 1994, 432–35.
Mizuguchi et al. Ber. Bunsenges. Phys. Chem., 96(4), 1992, 597–606.
Derwent Abstract 95-187221/25 of EP0,654,506 (1995).

Primary Examiner—Johann Richter
Assistant Examiner—Laura Lutz
Attorney, Agent, or Firm—Michele A. Kovaleski; Kevin T. Mansfield

[57] ABSTRACT

The invention relates to mixed crystals of 1,4-diketopyrrolo [3,4-c]pyrroles, consisting of 1 mol each of two different compounds of formulae

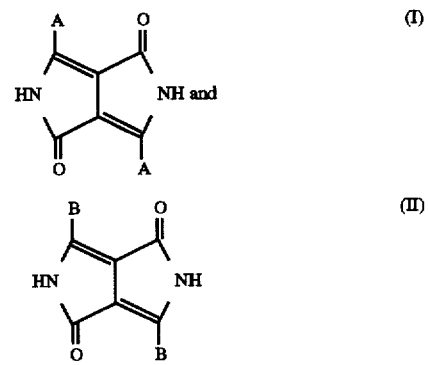

as well as single-phase solid solutions of two different compounds of formulae I and II, wherein the diketopyrrolopyrrole having the smaller geometrical constitution is present in an amount of 53 to 70 mol %. A and B are as defined in claim 1. The novel mixed crystals as well as the novel solid solutions are admirably suited for pigmenting organic material of high molecular weight.

7 Claims, No Drawings

MIXED CRYSTALS AND SOLID SOLUTION OF 1,4-DIKETOPYRROLOPYRROLES

The present invention relates to novel single-phase mixed crystals and solid solutions of two different symmetrical 1,4-diketopyrrolopyrroles and to the use thereof as pigments. 1,4-Diketopyrrolopyrroles, including also asymmetrical 1,4-diketopyrrolopyrroles, i.e. of the

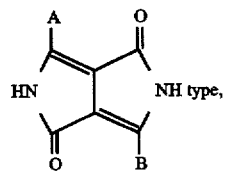

their preparation and the use thereof as pigments are disclosed, inter alia, in U.S. Pat. No. 4,579,949. U.S. Pat. No. 4,778,899 discloses a process for the preparation of pure asymmetrical 1,4-diketopyrrolopyrroles. This process consists of an elaborate synthesis which is carried out via the stage of special amino esters or pyrrolinones.

U.S. Pat. No. 4,783,540 furthermore discloses that solid solutions can be obtained by mixing two different 1,4-diketopyrrolopyrroles, preferably in the ratio of 65–90:10–35% by weight, and carrying out subsequent treatment such as heating, grinding or precipitating. These solid solutions are characterised by their X-ray diffraction patterns, the X-ray diffraction patterns of the solid solutions being different from the sum of the X-ray diffraction patterns of the single components. However, it has been found that the products of all examples are exclusively polyphase solid solutions, i.e. the corresponding X-ray diffraction patterns, in addition to showing the novel lines of the solid solutions, also show lines of the one and/or of the other single component.

It has now been found that mixtures of two different symmetrical 1,4-diketopyrrolopyrroles of the

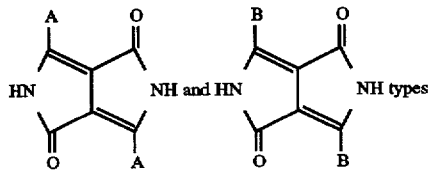

in the molar ratio of 1:1, which are treated as described above, form novel mixed crystals which, very surprisingly, are isomorphous with the crystals of the corresponding asymmetrical 1,4-diketopyrrolopyrroles of the

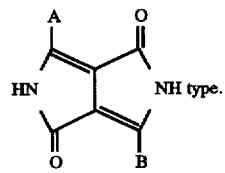

These products are single-phase products whose X-ray diffraction spectrum differs from that of the single components of the mixed crystal and also from that of their physical mixture. The X-ray diffraction spectrum of the mixed crystal and that of the asymmetrical single component is, however, identical.

Accordingly, the invention relates to mixed crystals of 1,4-diketopyrrolo[3,4-c]pyrroles, consisting of two different compounds of formulae

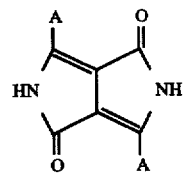

and

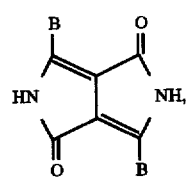

in the molar ratio of 1:1, wherein A and B, which must be different, are each a group of formula

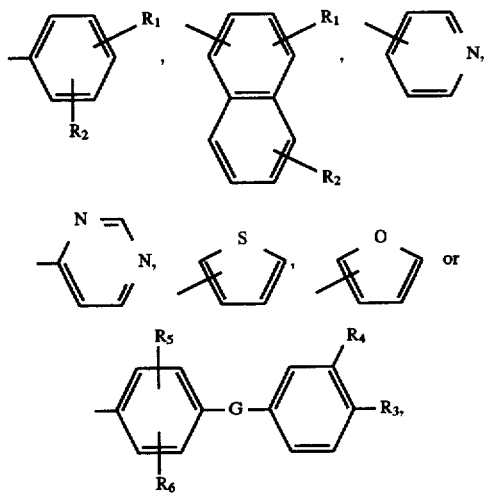

wherein
$R_1$ and $R_2$ are each independently of the other hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_1$–$C_{18}$alkoxycarbonyl, $C_1$–$C_{18}$alkylaminocarbonyl, —CN, —NO$_2$, trifluoromethyl, $C_5$–$C_6$cycloalkyl, —C=N—($C_1$–$C_{18}$alkyl),

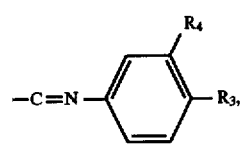

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH$_2$—, —CH(CH$_3$)—, —C(CH$_3$)$_2$—, —CH=N—, —N=N—, —O—, —S—, —SO—, —SO$_2$—, —CONH— or —NR$_7$—, $R_3$ and $R_4$ are each independently of the other hydrogen, halogen, $C_1$–$C_6$alkyl, $C_1$–$C_{18}$alkoxy or —CN, $R_5$ and $R_6$ are each independently of the other hydrogen, halogen or $C_1$–$C_6$alkyl, and $R_7$ is hydrogen or $C_1$–$C_6$alkyl, with the proviso that, if one of the radicals A and B is phenyl, then the other cannot be p-chlorophenyl.

Substituents defined as halogen are typically iodo, fluoro, preferably bromo and, most preferably, chloro;

$C_1$–$C_6$alkyl is typically methyl, ethyl, n-propyl, isopropyl, n-butyl, sec-butyl, tert-butyl, n-amyl, tert-amyl, hexyl, and $C_1$–$C_{18}$alkyl is in addition typically heptyl, octyl, 2-ethylhexyl, nonyl, decyl, dodecyl, tetradecyl, hexadecyl or octadecyl.

$C_1$–$C_{18}$Alkoxy is, also in $C_1$–$C_{18}$alkoxycarbonyl, typically methoxy, ethoxy, n-propoxy, isopropoxy, butoxy, hexyloxy, decyloxy, dodecyloxy, hexadecyloxy or octadecyloxy.

$C_1$–$C_{18}$Alkylmercapto is, for example, methylmercapto, ethylmercapto, propylmercapto, butylmercapto, octylmercapto, decylmercapto, hexadecylmercapto or octadecylmercapto.

$C_1$–$C_{18}$Alkylamino is, also in $C_1$–$C_{18}$alkylaminocarbonyl, typically methylamino, ethylamino, propylamino, hexylamino, decylamino, hexadecylamino or octadecylamino.

$C_5$–$C_6$cycloalkyl is typically cyclopentyl and, preferably, cyclohexyl.

Of particular interest are those novel mixed crystals wherein A and B in formulae I and II are each a group of formula

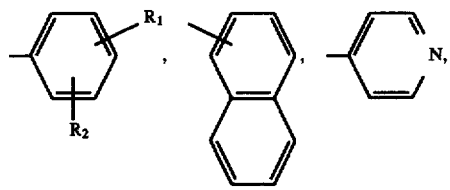

wherein
$R_1$ and $R_2$ are each independently of the other hydrogen, chloro, bromo, $C_1$–$C_4$alkyl, $C_1$–$C_6$alkoxy, $C_1$–$C_6$alkylamino or CN,
G is —O—, —$NR_7$—, —N=N— or —$SO_2$—,
$R_3$ and $R_4$ are hydrogen, and $R_7$ is hydrogen, methyl or ethyl,
and more particularly those mixed crystals wherein A and B in formulae I and II are each a group of formula

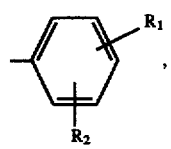

wherein
$R_1$ and $R_2$ are each independently of the other hydrogen, methyl, tert-butyl, chloro, bromo or CN. $R_2$ is preferably hydrogen.

The novel mixed crystals may be prepared starting from physical mixtures of the above defined components of formulae I and II in general accordance with the following per se known processes:

- by contacting in polar organic solvents, preferably by stirring the component mixture at reflux temperature,
- by alkaline precipitation of the component mixture in polar organic solvents or by stirring the component mixture in polar organic solvents in the presence of alkali metal alcoholates, alkali metal hydroxides or quaternary ammonium compounds, or
- by acid precipitation, i.e. by dissolving the component mixture in acid and precipitating the solid solution by dilution with water, which processes may be carried out in general accordance with the processes disclosed in detail, inter alia, in U.S. Pat. No. 4,783,540.

A novel method of preparation is that wherein the compounds of formulae I and II, including also those wherein A and B are each independently of the other phenyl and p-chlorophenyl, are reacted by per se known methods with a dicarbonate of formula $$D\text{-}O\text{-}D, \qquad (III)$$

or with a trihaloacetate of formula $$(R_8)_3 C\text{-}D, \qquad (IV)$$

or with an azide of formula $$DN_3, \qquad (V)$$

or with a carbonate of formula $$D\text{-}OR_9, \qquad (VI)$$

or with an alkylidene-iminooxyformate of formula

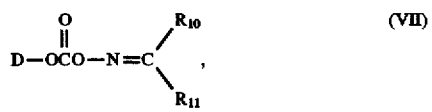

wherein D is a group of formula

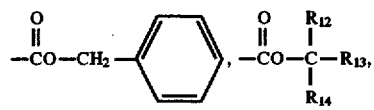

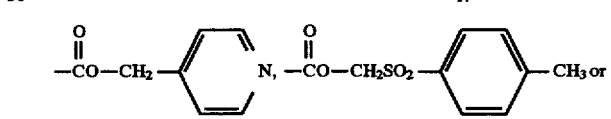

$R_8$ is chloro, fluoro or bromo, $R_9$ is $C_1$–$C_4$alkyl or phenyl which is unsubstituted or substituted by halogen, $C_1$–$C_4$alkyl, $C_1$–$C_4$alkoxy or —CN, $R_{10}$ is —CN or —$COOR_9$, and $R_{11}$ is phenyl which is unsubstituted or substituted by halogen, $C_1$–$C_4$alkyl, $C_1$–$C_4$alkoxy or —CN, $R_{12}$, $R_{13}$ and $R_{14}$ are each independently of one another hydrogen, $C_1$–$C_6$alkyl or $C_2$–$C_5$alkenyl, and at least two of $R_{12}$, $R_{13}$ and $R_{14}$ must be alkyl or alkenyl, in the molar ratio of 1:2 in an aprotic organic solvent in the presence of a base as catalyst, to soluble compounds of formulae

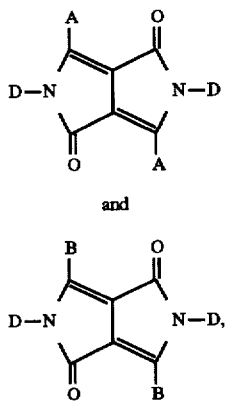

(VIII)

and (IX)

and these compounds are either a) mixed homogeneously in powdered form by generally known methods in the molar ratio of 1:1, or b) mixed homogeneously in powdered form by generally known methods in the molar ratio of 1:1 and the mixture is dissolved in a solvent, or c) first dissolved and then mixed in solution in the mixture ratio of 1:1, and subsequently the desired mixed crystal is precipitated from the dry or dissolved mixture by thermal, photolytic or chemical treatment.

$R_{12}$, $R_{13}$ and $R_{14}$ defined as $C_2$–$C_5$alkenyl are typically vinyl, allyl, methallyl, n-but-2-enyl, 2-methyl-prop-2-enyl or n-pent-2-enyl.

$R_{12}$ and $R_{14}$ are preferably methyl, and $R_{13}$ is $C_1$–$C_6$alkyl and, preferably, methyl.

D is preferably a group of formula

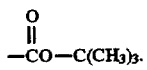

The compounds of formulae I and II are preferably reacted with a dicarbonate of formula III.

The dicarbonates of formula III, the trihaloacetates of formula IV, the azides of formula V, the carbonates of formula VI and the alkylidene-iminooxyformates of formula VII are known substances. However, any that are novel may be prepared in general accordance with known methods.

Suitable aprotic organic solvents are typically ethers, such as tetrahydrofuran or dioxane, or glycol ethers such as ethylene glycol methyl ether, ethylene glycol ethyl ether, diethylene glycol monomethyl ether or diethylene glycol monoethyl ether, and also dipolar aprotic solvents, typically acetonitrile, benzonitrile, N,N-dimethylformamide, N,N-dimethylacetamide, nitrobenzene, N-methylpyrrolidone, halogenated aliphatic or aromatic hydrocarbons, e.g. trichloroethane, benzene or alkyl-, alkoxy- or halogen-substituted benzene, such as toluene, xylene, anisol or chlorobenzene, or aromatic N-heterocycles, such as pyridine, picoline or quinoline. Preferred solvents are typically tetrahydrofuran, N,N-dimethylformamide, N-methylpyrrolidone. The indicated solvents may also be used as mixtures. It is expedient to use 5–20 parts by weight of solvent per 1 part by weight of the reactants.

Bases suitable for use as catalysts are typically the alkali metals themselves, such as lithium, sodium or potassium as well as the hydroxides and carbonates thereof, or alkali metal amides, such as lithium amide, sodium amide or potassium amide, or alkali metal hydrides, such as lithium hydride, sodium hydride or potassium hydride, or alkaline earth metal alcoholates or alkali metal alcoholates, which are derived in particular from primary, secondary or tertiary aliphatic alcohols containing 1 to 10 carbon atoms, typically lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic, aromatic or heterocyclic N-bases, including e.g. diazabicyclooctene, diazabicycloundecene and 4-dimethylaminopyridine, and trialkylamines such as trimethylamine or triethylamine. A mixture of these bases may also be used.

The organic N-bases are preferred, typically diazabicyclooctene, diazabicycloundecene and, preferably, 4-dimethylaminopyridine.

The reaction is conveniently carried out in the temperature range from 10 to 100° C., preferably from 14° to 40° C., and under atmospheric pressure.

The compounds of formula I or II are either mixed in powdered form in the desired ratio by standard known methods and the mixture is then dissolved in the solvent, or they are first dissolved in the solvent individually and the solutions are then mixed in the desired ratio.

The following solvents may be conveniently used: ethers such as tetrahydrofuran or dioxane, or glycol ethers such as ethylene glycol methyl ether, ethylene glycol ethyl ether, diethylene glycol monomethyl ether or diethylene glycol monoethyl ether, polyalcohols such as polyethylene glycol, ketones such as acetone, ethyl methyl ketone, isobutyl methyl ketone or cyclohexanone; and also dipolar aprotic solvents, typically including aceto-nitrile, benzonitrile, N,N-dimethylformamide, N,N-dimethylacetamide, nitrobenzene, N-methylpyrrolidone, dimethyl sulfoxide, halogenated aliphatic or aromatic hydrocarbons, such as trichloroethane, dichloromethane, chloroform, benzene or alkyl-, alkoxy- or halogensubstituted benzene, typically toluene, xylene, anisol or chlorobenzene, aromatic N-heterocycles, such as pyridine, picoline or quinoline or high-boiling solvents e.g. decaline, n-dodecane or kerosene, or mixtures thereof. Preferred solvents are typically toluene, diphenyl ether, N-methylpyrrolidone, N,N-dimethylformamide, dimethyl sulfoxide and quinoline.

The concentration of the compounds of formula I or II in the solvent or solvent system may vary greatly, depending on the solvent. It is convenient to use 0.1 to 20% by weight, preferably 0.2 to 5% by weight, of the compound of formula I or II, based on the entire solution.

The mixed crystals consisting of the compounds of formulae I and II may be obtained in simplest possible manner from the dry or dissolved mixture, either by subjecting the dry or dissolved mixture of the compounds of formulae VIII and IX a) to a thermal treatment, i.e. by heating to the temperature range from 50° to 400° C., preferably from 100° to 200° C., or by laser irradiation, b) to a photolytic treatment, i.e. by irradiation with wave lengths below 375 nm, or c) to a chemical treatment, i.e. with an organic or inorganic acid, such as acetic, tohenesulfonic, trifluoroacetic, hydrochloric or sulfuric acid, and by isolating the product so obtained by conventional methods.

As already mentioned, the X-ray diffraction pattern of the novel mixed crystals is characterised by lines differing from those of the X-ray diffraction patterns of the corresponding physical mixture and the corresponding single components, but is essentially identical with that of the asymmetrical diketopyrrolopyrrole of the

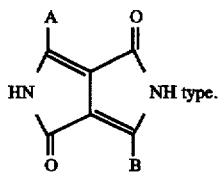

Surprisingly, however, it has also been found that, contrary to the expectation that the larger component will form the crystal lattice (host lattice) wherein the smaller component lodges as guest when a minor excess of the 1,4-diketopyrrolopyrrole having the smaller geometrical constitution is used, it is the 1:1 molar mixed crystal described above which forms first and in whose lattice the excess is lodged to form a solid solution. Accordingly, the single-phase solid solution so obtained has the same crystal lattice as the 1:1 molar mixed crystal, and the corresponding X-ray diffraction patterns are virtually identical.

Diketopyrrolopyrroles of smaller geometrical constitution will be understood as meaning compounds having smaller molecular dimensions (less steric hindrance) i.e. requiring less space. Based on the meanings of A and B:

unsubstituted phenyl<substituted phenyl;
p-methylphenyl<p-tert-butylphenyl;
cyanophenyl<chlorophenyl; etc.

The formation of such solid solutions makes it possible to achieve very interesting and useful changes in shade without affecting the good pigment properties.

Accordingly, the invention also relates to single-phase solid solutions of 1,4-diketopyrrolo[3,4-c]pyrroles, consisting of two different compounds of formulae

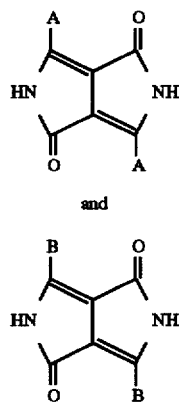

having the meaning indicated above,
with the proviso that the 1,4-diketopyrrolo[3,4-c]pyrrole having the smaller geometrical constitution is contained therein in an amount of 50 to 70 mol %, preferably of 55 to 60 mol %.

Substituents A and B here also have the preferred meanings indicated above for the 1:1 molar mixed crystals.

The novel solid solutions are prepared by exactly the same methods as those used for obtaining the novel 1:1 molar mixed crystals, except for the required amount of the two components.

Recrystallisation or thermal treatment is carded out by conventional methods for pigments. The usual method is that of thermal aftertreatment in water or in an organic solvent and, if required, under pressure. It is preferred to use organic solvents, typically benzenes which are substituted by halogen atoms, alkyl groups or nitro groups, such as xylenes, chlorobenzene, o-dichlorobenzene or nitrobenzene, as well as pyridine bases, typically pyridine, picoline or quinoline, and also ketones such as cyclohexanone, alcohols such as isopropanol, butanols or pentanols, ethers such as ethylene glycol monomethyl ether or ethylene glycol monoethyl ether, amides such as dimethyl formamide or N-methylpyrrolidone, as well as dimethyl sulfoxide or sulfolane. The aftertreatment may also be carried out in water, under normal or elevated pressure, in the presence of organic solvents and/or with the addition of surfactants.

The novel mixed crystals as well as the novel solid solutions may be used as pigments for colouring organic material of high molecular weight.

Illustrative examples of high molecular weight organic materials which can be coloured with the novel mixed crystals or solid solutions are cellulose ethers and esters, typically ethyl cellulose, nitro cellulose, cellulose acetate, cellulose butyrate, natural resins or synthetic resins, typically polymerisation or condensation resins, such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyester, ABS, polyphenylenoxides, rubber, casein, silicone and silicone resins, singly or in mixtures.

The above high molecular weight organic compounds may be obtained singly or as mixtures as plastics, melts or in the form of spinning solutions, paints, coating materials or printing inks. Depending on the end use requirement, it is expedient to use the mixed crystals or solid solutions of this invention as toners or in the form of preparations.

The mixed crystals or solid solutions of this invention can be used in an amount of 0.01 to 30% by weight, preferably of 0.1 to 10% by weight, based on the high molecular weight organic material to be pigmented.

The pigmenting of the high molecular weight organic materials with the mixed crystals or solid solutions of this invention is conveniently effected by incorporating such mixed crystals or solid solutions by themselves or in the form of masterbatches in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated into the novel mixed crystals or solid solutions before or after working the pigments into the polymers. To obtain different shades, it is also possible to add to the high molecular weight organic materials fillers or other chromophoric components such as white, coloured or black pigments in any amount, in addition to the novel mixed crystals or solid solutions.

For pigmenting paints, coating materials and printing inks, the high molecular weight organic materials and the mixed crystals or solid solutions of this invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The novel mixed crystals and solid solutions are particularly suitable for colouring plastics, more particularly polyvinyl chloride and polyolefins, and paints, preferably automotive lacquers.

When used for colouring e.g. polyvinyl chloride or polyolefins, the novel mixed crystals as well as the novel solid solutions have good allround pigment properties, such as good dispersibility, superior colour strength and purity, good fastness to migration, heat, light and weathering as well as good hiding power.

The invention is illustrated by the following Examples.

EXAMPLE 1 a) 27.94 g (0.128 mol) of di-tert-butyl dicarbonate are added in 3 increments at one hour intervals to a mixture of 14.75 g (0.0512 mol) of 1,4-diketo-3,6-diphenyl-pyrrolo[3,4 -c]pyrrole and 3.23 g (0.0264 mol) of 4-dimethylaminopyridine in 500 ml of tetrahydrofuran (dried over a molecular sieve). The red suspension so obtained is stirred for 2 hours at room temperature, with exclusion of atmospheric moisture, to give a dark green solution. The solvent is distilled off under reduced pressure. The yellow residue is washed with a 5% solution of aqueous sodium bicarbonate, rinsed with water and dried under vacuum at room temperature, to give 24.5 g (98% of theory) of N,N-di-tert-butoxy-carbonyl-1,4-diketo-3,6-diphenylpyrrolo[3,4-c]pyrrole.

Analysis $^1$H-NMR (CDCl$_3$): 7.75 (d, 4H); 7.48–7.50 (m, 6H); 1.40 (s, 18H).

b) 24.29 g (0.111 mol) of di-tert-butyl dicarbonate are added to a mixture of 8.44 g (0.021 mol) of 1,4-diketo-3,6-di-(4-tert-butylphenyl)pyrrolo[3,4-c]pyrrole and 1.49 g (0.012 mol) of 4-dimethylaminopyridine in 100 ml of N,N-dimethylformamide (dried over a molecular sieve). The red suspension so obtained is stirred for 3 hours at room temperature, with exclusion of atmospheric moisture. The colour changes to orange. The precipitated substance is isolated by filtration, the residue is washed repeatedly with cold distilled water and dried under vacuum at room temperature, to give 11.40 g (90% of theory) of N,N'-di-tert-butoxycarbonyl- 1,4-diketo-3,6-di-(4-tert-butylphenyl) pyrrolo-[3,4-c]pyrrole as a brilliant yellow product.

Analysis $^1$H-NMR (CDCl$_3$): 7.69 (d, 4H); 7.48 (d, 4H); 1.43 (s, 18H); 1.34 (s, 18H).

c) A mixture of 1.50 g (3.07 mmol) of N,N'-di-tert-butoxycarbonyl-1,4-diketo-3,6-diphenylpyrrolo[3,4-c] pyrrole (a) and 1.84 g (3.07 mmol) of N,N'-di-tert-butoxycarbonyl-1,4-diketo-3,6-di(4-tert-butylphenyl) pyrrolo[3,4-c]pyrrole (b) is dissolved in 100 ml of toluene at room temperature. The yellow solution is heated, with stirring, to 70° C. and then 2.90 g of toluene-4-sulfonic acid monohydrate are added. The mixture is heated to 100° C., stirred at this temperature for 16 hours, and then allowed to cool to room temperature. The solid purple substance so obtained is isolated by filtration, washed first with methanol and then with distilled water and dried in a vacuum drying oven at 60° C., to give 1.86 g (87.9% of theory) of a purple-red powder.

| Analysis: | C | H | N |
|---|---|---|---|
| calcd.: | 76.73% | 5.85% | 8.13% |
| found: | 76.80% | 5.82% | 8.05% |

The complete X-ray diffraction patterns are determined by conventional methods with a Siemens D 500® X-ray diffraction meter (CuK$_\alpha$ irradiation).

The X-ray diffraction pattern is characterised by the following diffraction lines:

| Interplanar spacings (d-values in Å) | Scattering angles (2Θ) | Relative intensity |
|---|---|---|
| 18.9113 | 4.669 | 100 |
| 6.1915 | 14.294 | 7 |
| 4.9491 | 17.908 | 43 |
| 3.3535 | 26.559 | 48 |
| 3.2997 | 26.559 | 22 |

In comparison, the X-ray diffraction pattern of the known asymmetrical diketopyrrolopyrrole of formula

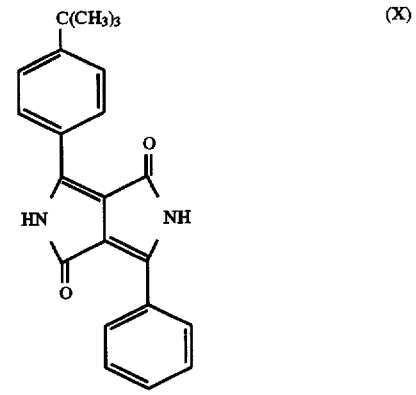

(X)

is characterised by the following diffraction lines:

| Interplanar spacings (d-values in Å) | Scattering angles (2Θ) | Relative intensity |
|---|---|---|
| 18.5598 | 4.757 | 100 |
| 6.1761 | 14.329 | 8 |
| 4.9262 | 17.992 | 27 |
| 3.3446 | 26.631 | 32 |
| 3.2901 | 27.080 | 15 |

In PVC and paint colorations, the mixed complex behaves in identical manner to that of the corresponding asymmetrical diketopyrrolopyrrole of formula X.

EXAMPLE 2 a) 1.78 g of 4-dimethylaminopyridine and then 26.8 g of di-tert-butyl dicarbonate are added to a suspension of 20.0 g of 1,4-diketo-3,6-di-(4-chlorophenyl)-pyrrolo[3,4-c]pyrrole in 500 ml of N,N'-dimethylformamide. The reaction mixture is stirred at room temperature, excluding atmospheric moisture. After 15 hours a further 26.8 g of di-tert-butyl dicarbonate are added and stirring is continued for 30 hours. The precipitated brownish orange product is isolated by filtration, washed with methanol and dried under vacuum at room temperature, to give 21.8 g (70% of theory) of the product of formula

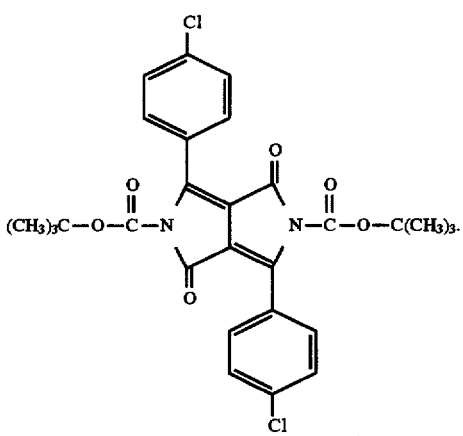

| Analysis: | C | H | N | Cl |
|---|---|---|---|---|
| calcd.: | 60.33% | 4.70% | 5.03% | 12.72% |
| found: | 60.24% | 4.79% | 4.92% | 12.50% | b) 15.2 g of di-tert-butyl dicarbonate are added to a mixture of 10.0 g of 1,4-diketo-3,6-di-(3-methylphenyl)pyrrolo[3,4-c]pyrrole and 1.0 g of 4-dimethylaminopyridine in 350 ml of tetrahydrofuran. The orange suspension so obtained is stirred for 20 hours at room temperature, excluding atmospheric moisture. The solvent is then distilled off under reduced pressure. The brown residue is first washed with water and then with methanol and dried under vacuum at room temperature, to give 14.1 g (86.5% of theory) of a brilliant yellow product of formula

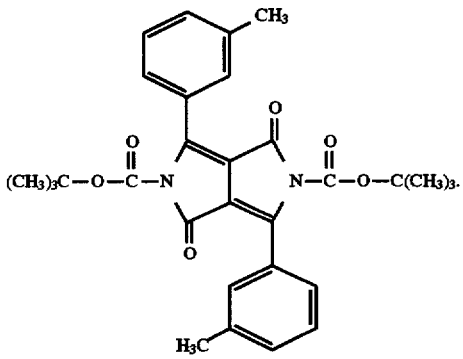

| Analysis: | C | H | N |
|---|---|---|---|
| calcd.: | 69.75% | 6.24% | 5.42% |
| found: | 69.82% | 6.40% | 5.47% | c) A mixture of 6.97 g (12.5 mmol) of the product of a) and 6.46 g (12.5 mmol) of the product of b) in 400 ml of toluene is heated, with stirring, to 60° C. and then 11.89 g of toluene-4-sulfonic acid are added. The mixture is heated to 100° C., stirred at this temperature for 2 hours and then allowed to cool to room temperature. The precipitated product is isolated by filtration, heated in 300 ml of methanol to 60° C. and stirred for 30 minutes at this temperature. The product is then isolated by filtration, washed first with methanol, then with distilled water and dried under vacuum at 60° C., to give 6.8 g (81% of theory) of a red powder.

| Analysis: | C | H | N | Cl |
|---|---|---|---|---|
| calcd.: | 67.76% | 3.89% | 8.32% | 10.53% |
| found: | 66.92% | 3.89% | 8.24% | 11.13% |

The X-ray diffraction pattern is characterised by the following diffraction lines:

| Interplanar spacings (d-values in Å) | Scattering angles (2Θ) | Relative intensity |
|---|---|---|
| 15.3172 | 5.765 | 99 |
| 7.5658 | 11.687 | 14 |
| 6.8504 | 12.913 | 26 |
| 6.3196 | 14.003 | 34 |
| 6.1515 | 14.387 | 48 |
| 5.0223 | 17.645 | 22 |
| 3.6887 | 24.107 | 22 |
| 3.3206 | 26.827 | 100 |
| 3.1567 | 28.248 | 17 |

In comparison, the X-ray diffraction pattern of the known asymmetrical diketopyrrolopyrrole of formula

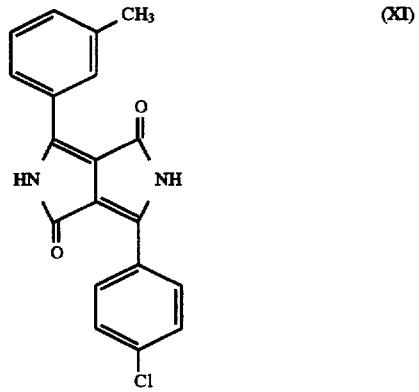

(XI)

is characterised by the following diffraction lines:

| Interplanar spacings (d-values in Å) | Scattering angles (2Θ) | Relative intensity |
|---|---|---|
| 15.3005 | 5.772 | 100 |
| 7.5601 | 11.696 | 13 |
| 6.8195 | 12.971 | 24 |
| 6.2099 | 14.251 | 54 |
| 5.0456 | 17.563 | 24 |
| 3.6945 | 24.069 | 22 |
| 3.3298 | 26.751 | 80 |
| 3.1446 | 28.359 | 17 |

In PVC and paint colorations the mixed complex behaves in identical manner to that of the asymmetrical diketopyrrolopyrrole of formula XI.

EXAMPLE 3 a) (Preparation of the Mixed Crystal)

A mixture of 7.21 g (12.0 mmol) of the product of Example 1b) and 6.69 g (12.0 mmol) of the product of Example 2a) is heated, with stirring, in 380 ml of toluene to 60° C. Then 11.41 g of toluene-4-sulfonic acid are added. The mixture is heated to 100° C., stirred for 2 hours at this temperature and then cooled to room temperature. The precipitated pigment is isolated by filtration, washed first with methanol, then with distilled water and dried under vacuum at 80° C., to give 8.27 g (91% of theory) of a red powder.

| Analysis: | C | H | N | Cl |
|---|---|---|---|---|
| calcd.: | 69.25% | 4.94% | 7.42% | 9.93% |
| found: | 69.67% | 5.05% | 7.40% | 9.32% |

The X-ray diffraction pattern is characterised by the following diffraction lines:

| Interplanar spacings (d-values in Å) | Scattering angles (2Θ) | Relative intensity |
|---|---|---|
| 19.4208 | 4.55 | 59 |
| 6.3517 | 13.93 | 15 |
| 4.9880 | 17.77 | 83 |
| 3.7947 | 23.42 | 7 |
| 3.6444 | 24.40 | 7 |
| 3.3649 | 26.47 | 100 |
| 3.2301 | 27.59 | 31 |
| 3.1587 | 28.23 | 8 |
| 3.0305 | 29.45 | 9 | b) (Preparation of the Solid Solution from the Soluble Diketopyrrolopyrroles)

A mixture of 2.40 g (4.0 mmol) of the product of Example 1b) and 3.34 g (6.0 mmol) of the product of Example 2a) is heated, with stirring, in 150 ml of toluene to 60° C. To the solution so obtained are added 2.38 g of toluene-4-sulfonic acid monohydrate and heated to 100° C. This mixture is stirred for 2 hours at this temperature and is then allowed to cool to room temperature. The solid red substance so obtained is isolated by filtration, washed first with methanol, then with water and dried in a vacuum drying oven at 80° C., to give 3.5 g (93% of theory) of a red powder.

| Analysis: | C | H | N | Cl |
|---|---|---|---|---|
| calcd.: | 67.99% | 4.63% | 7.48% | 11.36% |
| found: | 67.93% | 4.65% | 7.52% | 11.48% |

The X-ray diffraction pattern is characterised by the following diffraction lines:

| Interplanar spacings (d-values in Å) | Scattering angles (2Θ) | Relative intensity |
|---|---|---|
| 19.3152 | 4.57 | 70 |
| 6.3410 | 13.96 | 19 |
| 4.9820 | 17.79 | 89 |
| 3.7899 | 23.45 | 9 |
| 3.6375 | 24.45 | 11 |
| 3.3617 | 26.49 | 100 |
| 3.2272 | 27.62 | 33 |
| 3.1664 | 28.16 | 16 |
| 3.0262 | 29.49 | 11 |

From the above it may be seen that the crystal structure of this solid solution is virtually identical with that of the corresponding mixed crystal (a).

EXAMPLE 4 a) (Preparation of the Soluble Diketopyrrolopyrrole)

0.92 g of 4-dimethylaminopyridine are added to a mixture of 10.15 g of 1,4-diketo-3,6-di-(4-cyanophenyl)pyrrolo[3,4-c]pyrrole and 19.6 g of di-tert-butyl dicarbonate in 400 ml of tetrahydrofuran. The red suspension so obtained is stirred for 20 hours at room temperature, excluding atmospheric moisture. The solvent is distilled off under reduced pressure. The brown residue is washed with methanol and dried under vacuum at room temperature, to give 10.6 g (66% of theory) of N,N'-di-tert-butoxycarbonyl-1,4-diketo-3,6-di-(4-cyanophenyl)pyrrolo[3,4-c]pyrrole.

| Analysis: | C | H | N |
|---|---|---|---|
| calcd.: | 66.91% | 4.87% | 10.40% |
| found: | 66.84% | 5.02% | 10.32% | b) (Preparation of the Mixed Crystal)

A mixture of 6.69 g (12.0 mmol) of the product of Example 2a) and 6.46 g (12.0 mmol) of the product of a) is heated, with stirring, in 380 ml of toluene to 60° C. Subsequently, 11.41 g of toluene-4-sulfonic acid are added, and the mixture is heated to 100° C., stirred for 1.5 hours at this temperature and then cooled to room temperature, to give 8.40 g of a purple powder.

| Analysis: | C | H | N | Cl |
|---|---|---|---|---|
| calcd.: | 65.76% | 2.90% | 12.20% | 9.92% |
| found: | 64.55% | 3.12% | 12.00% | 9.62% |

The X-ray diffraction pattern is characterised by the following diffraction lines:

| Interplanar spacings (d-values in Å) | Scattering angles (2Θ) | Relative intensity |
|---|---|---|
| 15.5974 | 5.66 | 58 |
| 7.8658 | 11.24 | 25 |
| 6.5248 | 13.56 | 31 |
| 6.0649 | 14.59 | 36 |
| 3.8137 | 23.31 | 21 |
| 3.3093 | 26.92 | 100 |
| 2.9923 | 29.84 | 24 | c) (Preparation of the Solid Solution by Alkaline Precipitation)

A suspension of 1.43 g (4.0 mmol) of 1,4-diketo-3,6-di-(4-chlorophenyl)pyrrolo-[3,4-c]pyrrole, 2.03 g (6.0 mmol) of 1,4-diketo-3,6-di-(4-cyanophenyl)pyrrolo-[3,4-c]pyrrole and 1.24 g of potassium hydroxide in 75 ml of dimethylsulfoxide is heated to 50° C. and stirred at this temperature for 2 hours. The reaction mixture is then cooled to room temperature and forced into a mixture of 150 ml of water and 2.2 ml of hydrochloric acid (fuming, 37%) and then stirred at room temperature for 4 hours. The red mixture is subjected to filtration and the filter cake is washed with methanol and then with water and the pigment is dried under vacuum at 80° C., to give 3.2 g of a red powder.

| Analysis: | C | H | N | Cl |
|---|---|---|---|---|
| calcd.: | 66.68% | 2.91% | 12.96% | 8.20% |
| found: | 66.02% | 3.01% | 12.75% | 8.02% |

The X-ray diffraction pattern is characterised by the following diffraction lines:

| Interplanar spacings (d-values in Å) | Scattering angles (2Θ) | Relative intensity |
|---|---|---|
| 16.0744 | 5.49 | 100 |
| 7.8749 | 11.23 | 30 |
| 6.5456 | 13.52 | 36 |
| 6.0875 | 14.54 | 48 |
| 3.7996 | 23.39 | 28 |
| 3.2872 | 27.11 | 100 |
| 3.0003 | 29.75 | 26 |

From the above it may be seen that the crystal structure of this solid solution is virtually identical to that of the corresponding mixed crystal (b).

EXAMPLE 5 a) (Preparation of the Soluble Diketopyrrolopyrrole)

27.3 g of di-tert-butyl dicarbonate and then 1.53 g of 4-dimethylaminopyridine are added to a suspension of 17.9 g of 1,4-diketo-3,6-di-(3-chlorophenyl)pyrrolo[3,4-c]pyrrole in 500 ml of tetrahydrofuran. The reaction mixture is stirred for 24 hours at room temperature, excluding atmospheric moisture. The solvent is then distilled off under reduced pressure. The residue is washed with methanol and then dried under vacuum at room temperature, to give 24.8 g (89% of theory) of N,N'-di-tert-butoxycarbonyl-1,4-diketo-3,6-di-(3-chlorophenyl)pyrrolo[3,4-c]pyrrole as a brilliant yellow product.

| Analysis: | C | H | N | Cl |
|---|---|---|---|---|
| calcd.: | 60.33% | 4.70% | 5.03% | 12.72% |
| found: | 60.33% | 4.79% | 5.03% | 12.72% | b) (Preparation of the Mixed Crystal from the Soluble Diketopyrrolopyrrole)

A mixture of 4.89 g (10.0 mmol) of the product of Example 1a) and 5.57 g (10.0 mmol) of the product of a) is heated, with stirring, in 350 ml of toluene to 60° C. To the solution so obtained are added 9.51 g of toluene-4-sulfonic acid monohydrate and the mixture is heated to 105° C. and then allowed to cool to room temperature. The solid substance so obtained is isolated by filtration, washed first with methanol and then with water and dried under vacuum at 80° C., to give 6.1 g of a red powder.

| Analysis: | C | H | N | Cl |
|---|---|---|---|---|
| calcd.: | 66.99% | 3.44% | 8.68% | 10.98% |
| found: | 66.48% | 3.42% | 8.68% | 11.25% |

The X-ray diffraction pattern is characterised by the following diffraction lines:

| Interplanar spacings (d-values in Å) | Scattering angles (2Θ) | Relative intensity |
|---|---|---|
| 14.3114 | 6.17 | 92 |
| 6.7532 | 13.10 | 52 |
| 6.4304 | 13.76 | 25 |
| 5.8638 | 15.10 | 25 |
| 4.7102 | 18.83 | 35 |
| 3.7250 | 23.87 | 33 |
| 3.4730 | 25.63 | 44 |
| 3.2671 | 27.27 | 100 |
| 2.3366 | 38.50 | 11 | c) (Preparation of the Mixed Crystal by Alkaline Precipitation)

A mixture of 2.02 g (7.0 mmol) of 1,4-diketo-3,6-diphenylpyrrolo[3,4-c]pyrrole, 2.50 g (7.0 mmol) of 1,4-diketo-3,6-di-(3-chlorophenyl)pyrrolo[3,4-c]pyrrole and 1.24 g of sodium hydroxide in 100 ml of 1-methyl-2-pyrrolidone is stirred for 24 hours at room temperature. The reaction mixture is then charged over 70 minutes to a mixture of 100 ml of methanol, 100 ml of water and 1.67 ml of concentrated sulfuric acid and then stirred at room temperature for 6 hours. The red mixture is isolated by filtration, washed with water and dried under vacuum at 60° C., to give 4.1 g (87% of theory) of a red powder.

| Analysis: | C | H | N | Cl |
|---|---|---|---|---|
| calcd.: | 66.99% | 3.44% | 8.68% | 10.98% |
| found: | 66.68% | 3.47% | 8.68% | 10.84% |

The X-ray diffraction pattern is characterised by the following diffraction lines:

| Interplanar spacings (d-values in Å) | Scattering angles (2Θ) | Relative intensity |
|---|---|---|
| 14.2590 | 6.19 | 100 |
| 6.7650 | 13.08 | 41 |
| 6.4380 | 13.74 | 24 |
| 5.9045 | 14.99 | 22 |
| 4.7043 | 18.85 | 39 |
| 3.7186 | 23.91 | 32 |
| 3.4688 | 25.66 | 40 |
| 3.2725 | 27.23 | 89 |
| 2.3380 | 38.47 | 10 | d) (Preparation of the Solid Solution by Alkaline Precipitation)

A mixture of 1.73 g (6.0 mmol) of 1,4-diketo-3,6-diphenylpyrrolo[3,4-c]pyrrole, 1.43 g (4.0 mmol) of 1,4-diketo-3,6-di-(3-chlorophenyl)pyrrolo[3,4-c]pyrrole and 0.88 g of sodium hydroxide in 75 ml of 1-methyl-2-pyrrolidone is heated to 50° C. and stirred overnight at this temperature. The reaction mixture is then cooled to room temperature and charged over 75 minutes to a mixture of 75 ml of methanol, 75 ml of water and 1.2 ml of concentrated sulfuric acid at 10° C. and then stirred at room temperature for 20 hours. The red mixture is filtered off, washed with methanol and then with water and dried under vacuum at 60° C., to give 2.7 g (85% of theory) of a red powder.

| Analysis: | C | H | N | Cl |
|---|---|---|---|---|
| calcd.: | 69.20% | 3.65% | 8.97% | 7.94% |
| found: | 68.05% | 3.64% | 8.92% | 8.60% |

The X-ray diffraction pattern is characterised by the following diffraction lines:

| Interplanar spacings (d-values in Å) | Scattering angles (2Θ) | Relative intensity |
|---|---|---|
| 14.4039 | 6.13 | 100 |
| 6.7881 | 13.03 | 34 |
| 6.4211 | 13.78 | 22 |
| 5.9361 | 14.91 | 20 |
| 4.7087 | 18.83 | 34 |
| 3.7402 | 23.77 | 30 |
| 3.4720 | 25.64 | 32 |
| 3.2886 | 27.09 | 80 |
| 2.3381 | 38.47 | 10 |

From the above it may be seen that the crystal structure of this solid solution is virtually identical with that of the corresponding mixed crystal (b & c).

EXAMPLE 6

Example 4 is repeated, with the sole exception that the 1,4diketo-3,6-di-(4-cyanophenyl)pyrrolo[3,4-c]pyrrole is replaced with the equivalent amount of 1,4-diketo-3,6-diphenylpyrrolo[3,4-c]pyrrole. A mixed crystal is obtained whose crystal structure is virtually identical with that of the corresponding asymmetrical diketo-pyrrolopyrrole of formula

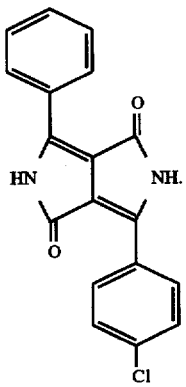

| Analysis: | C | H | N | Cl |
|---|---|---|---|---|
| calcd.: | 66.99% | 3.44% | 8.68% | 10.98% |
| found: | 66.36% | 3.50% | 8.63% | 11.02% |

EXAMPLE 7

Example 1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3-cyanophenyl)pyrrolo[3,4-c]pyrrole. A mixed crystal is obtained whose crystal structure is virtually identical with that of the corresponding asymmetrical diketopyrrolopyrrole of formula

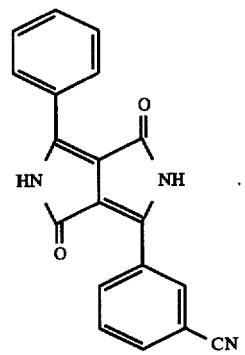

| Analysis: | C | H | N |
|---|---|---|---|
| calcd.: | 72.84% | 3.54% | 13.41% |
| found: | 72.07% | 3.63% | 13.15% |

EXAMPLE 8

Example 1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3,4-dichlorophenyl)pyrrolo[3,4-c]pyrrole. A mixed crystal is obtained whose crystal structure is virtually identical to that of the corresponding asymmetrical diketopyrrolopyrrole of formula

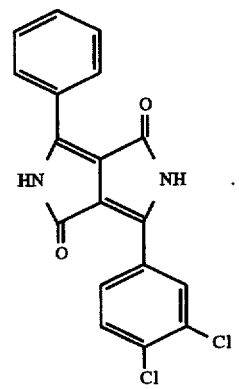

| Analysis: | C | H | N | Cl |
|---|---|---|---|---|
| calcd.: | 60.53% | 2.82% | 7.84% | 19.85% |
| found: | 60.47% | 2.95% | 7.83% | 19.55% |

EXAMPLE 9

Example 4c) is repeated, with the exception that 4.0 mmol of 1,4-diketo-3,6-di-(4-chlorophenyl)pyrrolo[3,4-c]pyrrole and 6.0 mmol of 1,4-diketo-3,6-di-(4-cyanophenyl)pyrrolo[3,4-c]pyrrole are replaced with 5.0 mmol of 1,4-diketo-3,6-di-(4-chlorophenyl)pyrrolo[3,4-c]pyrrole and 5.0 mmol of 1,4-diketo-3,6-di-(3,4-dichloro-phenyl)pyrrolo[3,4-c]pyrrole, and 1.24 g of potassium hydroxide and 75 ml of dimethyl-sulfoxide are replaced with 1.68 g of potassium hydroxide and 70 ml of dimethylsulfoxide. A mixed crystal is obtained whose crystal structure is virtually identical with that of the corresponding asymmetrical diketopyrrolopyrrole of formula

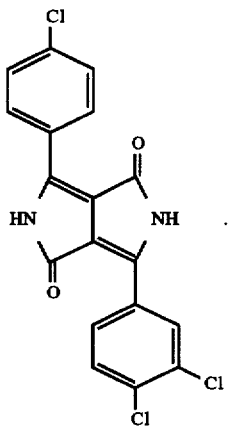

| Analysis: | C | H | N | Cl |
|---|---|---|---|---|
| calcd.: | 55.20% | 2.32% | 7.15% | 27.16% |
| found: | 55.14% | 2.47% | 7.11% | 26.53% |

EXAMPLE 10

Example 1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3-methylphenyl)pyrrolo[3,4-c]pyrrole. A mixed crystal is obtained whose crystal structure is virtually identical with that of the corresponding asymmetrical diketopyrrolopyrrole of formula

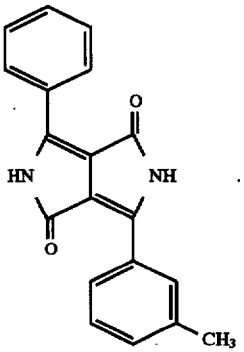

| Analysis: | C | H | N |
|---|---|---|---|
| calcd.: | 75.48% | 4.67% | 9.27% |
| found: | 75.12% | 4.75% | 9.21% |

EXAMPLE 11

Example 1 is repeated, with the sole exception that 1,4-diketo-3,6-diphenyl-pyrrolo[3,4-c]pyrrole and 1,4-diketo-3,6-di-(4-tert-butylphenyl)pyrrolo[3,4-c]pyrrole are replaced with the equivalent amount of 1,4-diketo-3,6-di-(4-chlorophenyl)pyrrolo-[3,4-c]pyrrole and 1,4-diketo-3,6-di-(4-methylphenyl)pyrrolo[3,4-c]pyrrole. A mixed crystal is obtained whose crystal structure is virtually identical with that of the corresponding asymmetrical diketopyrrolopyrrole of formula

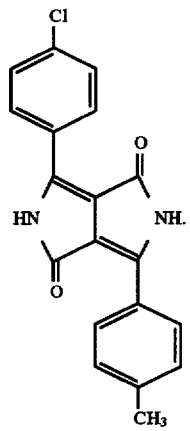

| Analysis: | C | H | N | Cl |
|---|---|---|---|---|
| calcd.: | 67.76% | 3.89% | 8.32% | 10.53% |
| found: | 67.52% | 4.00% | 8.26% | 10.68% |

EXAMPLE 12

Example 11 is repeated, with the sole exception that the 1,4-diketo-3,6-di-(4-methylphenyl)pyrrolo[3,4-c]pyrrole is replaced with the equivalent amount of 1,4-diketo-3,6-di-(3-cyanophenyl)pyrrolo[3,4-c]pyrrole. A mixed crystal is obtained whose crystal structure is virtually identical with that of the corresponding asymmetrical diketopyrrolopyrrole of formula

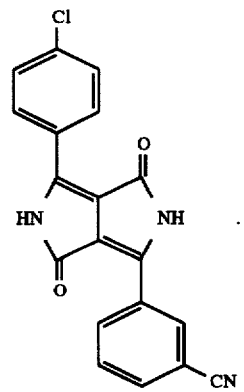

| Analysis: | C | H | N | Cl |
|---|---|---|---|---|
| calcd.: | 65.76% | 2.90% | 12.20% | 9.92% |
| found: | 65.16% | 3.17% | 11.88% | 10.06% |

EXAMPLE 13

7.5 g of the mixed crystal of Example 1, 98.9 g of a CAB solution consisting of 41.0 g of cellulose acetobutyrate ®CAB 531.1, 20% in butanol/xylene 2:1 (Eastman Chem.)

1.5 g of zirconium octoate, 18.5 g of ®SOLVESSO 150 (aromatic hydrocarbons; ESSO), 21.5 g of butyl acetate, and 17.5 g of xylene, 36.5 g of polyester resin ®DYNAPOL H700 (Dynamit Nobel), 4.6 g of melamine resin MAPRENAL MF650 (Hoechst) and 2.5 g of dispersant ®DISPERBYK 160 (Byk Chemie) are dispersed together over 90 minutes in a disperser (total varnish: 150 g; 5% of pigment).

For the base coat layer, 27.69 g of the mass-tone varnish so obtained are mixed with 17.31 g of Al stock solution (8%) consisting of 12.65 g of ®SILBERLINE SS 3334AR, 60% (Silberline Ltd.)

56.33 g of CAB solution (composition as above)

20.81 g of polyester resin ®DYNAPOL H700

2.60 g of melamine resin ®MAPRENAL MF650

7.59 g of ®SOLVESSO 150 and sprayed onto an aluminium sheet (wet film c. 20 μm). After drying in the air for 30 minutes at room temperature, a TSA varnish consisting of 29.60 g of acrylic resin ®URACRON 2263 XB, 50% in xylene/butanol (Chem. Fabrik Schweizerhalle ), 5.80 g of melamine resin ®CYMEL 327, 90% in isobutanol, 2.75 g of butyl glycol acetate, 5.70 g of xylene, 1.65 g of n-butanol 0.50 g of silicone oil, 1% in xylene, 3.00 g of light stabiliser ®TINUVIN 900, 10% in xylene (Ciba)

1.00 g of light stabiliser ®TINUVIN 292, 10% in xylene (Ciba)

is sprayed thereon as top coat finish (wet film c. 50 μm). After drying in the air for a further 30 minutes at room temperature, the varnish is stored for 30 minutes at 130° C.

EXAMPLE 14

0.6g of the mixed crystal of Example 5c is mixed with 67 g of polyvinyl chloride, 33 g of dioctylphthalate, 2 g of dibutyl tin dilaurate and 2 g of titanium dioxide and processed on a roll mill for 15 minutes at 160° C. to a thin film. The PVC film so obtained has superior colour strength and is resistant to migration and light.

EXAMPLE 15

1000 g of polypropylene granulate (®DAPLEN PT-55, Chemie LINZ) and 20 g of a 50% pigment preparation, consisting of 10 g of the solid solution of Example 3b and 10 g of Mg behenate, are thoroughly mixed in a mixer drum. The granulate so treated is then spun according to the melt spinning process in the temperature range from 260° to 285° C. Red filaments are obtained having excellent light and textile fastness properties.

What is claimed is:

1. Mixed single phase crystals of 1,4-diketopyrrolo[3,4-c]pyrroles, consisting of two different compounds of formulae in the molar ratio of 1:1, wherein A and B, which must be different, are each a group of formula wherein $R_1$ and $R_2$ are each independently of the other hydrogen, halogen, $C_1-C_{18}$alkyl, $C_1-C_{18}$alkoxy, $C_1-C_{18}$alkylmercapto, $C_1-C_{18}$alkylamino, $C_1-C_{18}$alkoxycarbonyl, $C_1-C_{18}$alkylaminocarbonyl, —CN, —NO$_2$, trifluoromethyl, $C_5-C_6$cycloalkyl, —C=N—($C_1-C_{18}$alkyl)

imidazolyl, pyrrazolyl, triazolyl, piperazinyl, pyrrolyl, oxazolyl, benzoxazolyl, benzothiazolyl, benazimidazolyl, morpholinyl, piperidinyl or pyrrolidinyl, G is —CH$_2$—, —CH(CH$_3$)—, —C(CH$_3$)$_2$—, —CH=N—, —N=N—, —O—, —S—, —SO—, —SO$_2$—, —CONH— or —NR$_7$—, $R_3$ and $R_4$ are each independently of the other hydrogen, halogen, $C_1-C_6$alkyl, $C_1-C_{18}$alkoxy or —CN, $R_5$ and $R_6$ am each independently of the other hydrogen, halogen or $C_1-C_6$alkyl, and $R_7$ is hydrogen or $C_1-C_6$alkyl, with the proviso that, if one of the radicals A and B is phenyl, then the other cannot be p-chlorophenyl.

2. Mixed crystals according to claim 1, wherein A and B in formulae I and II are each a group of formula

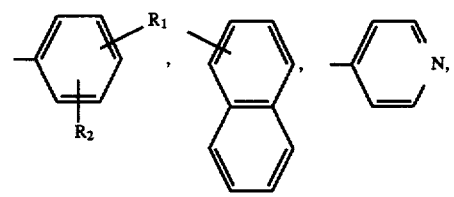

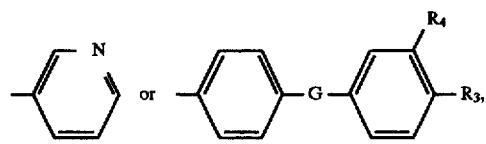

wherein

R₁ and R₂ are each independently of the other hydrogen, chloro, bromo, $C_1$-$C_4$alkyl, $C_1$-$C_6$alkoxy, $C_1$-$C_6$alkylamino or CN, G is —O—, —NR₇—, —N=N— or —SO₂—, R₃ and R₄ are hydrogen, and R₇ is hydrogen, methyl or ethyl.

3. Mixed crystals according to claim 2, wherein A and B in formulae I and II are each a group of formula

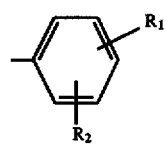

wherein

R₁ and R₂ are each independently of the other hydrogen, methyl, tert-butyl, chloro, bromo or CN.

4. Mixed crystals according to claim 3, wherein R₂ is hydrogen.

5. A single phase solid solution of 1,4-diketopyrrolo[3,4-c]pyrroles, consisting of two different compounds of formulae

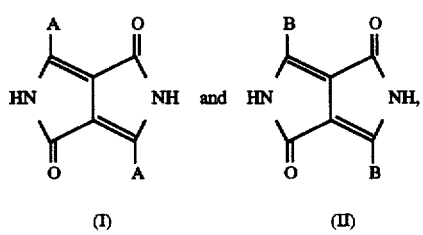

wherein

A and B, which must be different, are each a group of formula

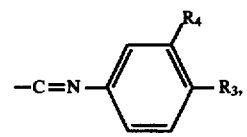

wherein

R₁ and R₂ are each independently of the other hydrogen, halogen, $C_1$-$C_{18}$alkyl, $C_1$-$C_{18}$alkoxy, $C_1$-$C_{18}$alkylmercapto, $C_1$-$C_{18}$alkylamino, —CN, —NO₂, trifluoromethyl $C_5$-$C_6$cycloalkyl, —C=N—($C_1$-$C_{18}$alkyl), $$-C=N-\underset{R_3}{\overset{R_4}{\bigcirc}}$$

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH₂—, —CH(CH₃)—, —C(CH₃)₂—, —CH=N—, —N=N—, —O—, —S—, —SO—, —SO₂— or —NR₇—, R₃ and R₄ are each independently of the other hydrogen, halogen, $C_1$-$C_6$alkyl, $C_1$-$C_{18}$alkoxy or —CN, R₅ and R₆ are each independently of the other hydrogen, halogen or $C_1$-$C_6$alkyl, and R₇ is hydrogen or $C_1$-$C_6$alkyl, with the proviso that the 1,4-diketopyrrolo[3,4-c]pyrrole having the smaller geometrical constitution is present in an amount of 55 to 60 mol %.

6. A solid solution according to claim 5, wherein A and B in formulae I and II are each a group of formula

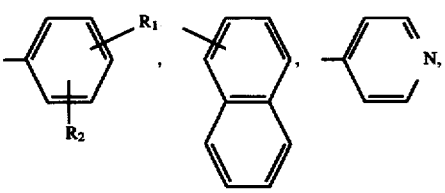

-continued

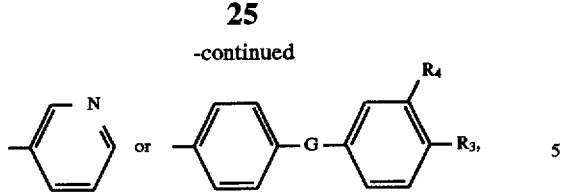 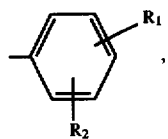

wherein
R$_1$ and R$_2$ are each independently of the other hydrogen, chloro, bromo, C$_1$-C$_4$alkyl, C$_1$-C$_6$alkoxy, C$_1$-C$_6$alkylamino or CN,
G is —O—, —NR$_7$—, —N=N— or —SO$_2$—,
R$_3$ and R$_4$ are hydrogen, and R$_7$ is hydrogen, methyl or ethyl.

7. A solid solution according to claim 6, wherein A and B in formulae I and II are each a group of formula wherein R$_1$ and R$_2$ are each independently of the other hydrogen, methyl, tert-butyl, chloro, bromo or CN.

* * * * *